Oct. 7, 1952  G. H. WADE, SR  2,612,863
HOUSING STRUCTURE FOR USE EITHER
AS AN INCUBATOR OR BROODER
Filed Aug. 30, 1950  2 SHEETS—SHEET 1
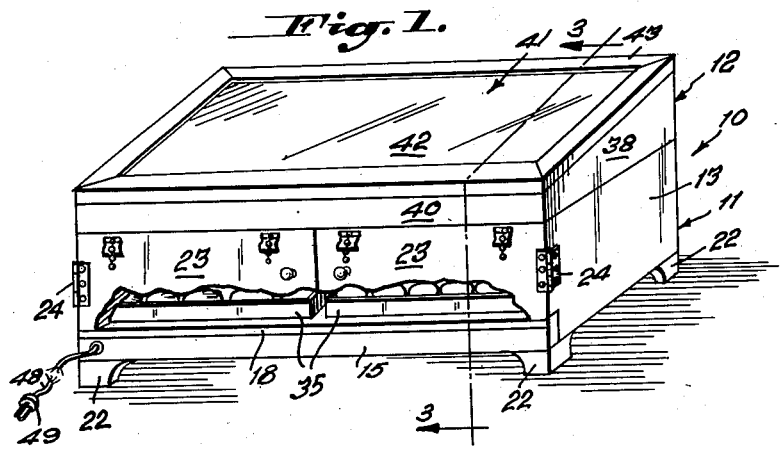
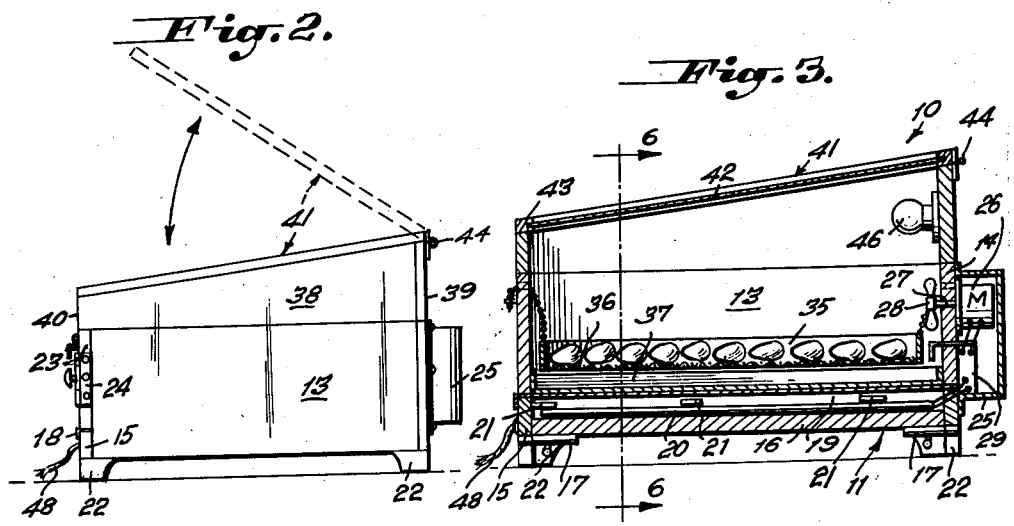
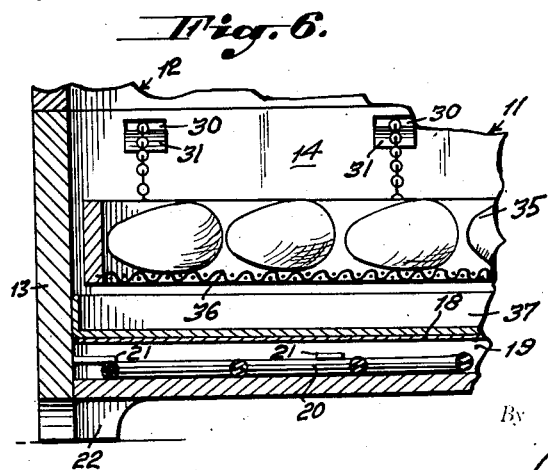
Inventor
George Harold Wade, Sr.
By John N. Randolph
Attorney

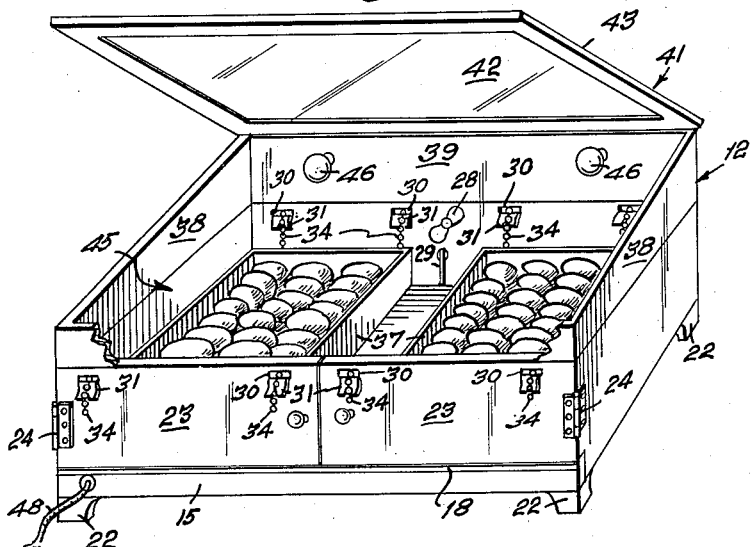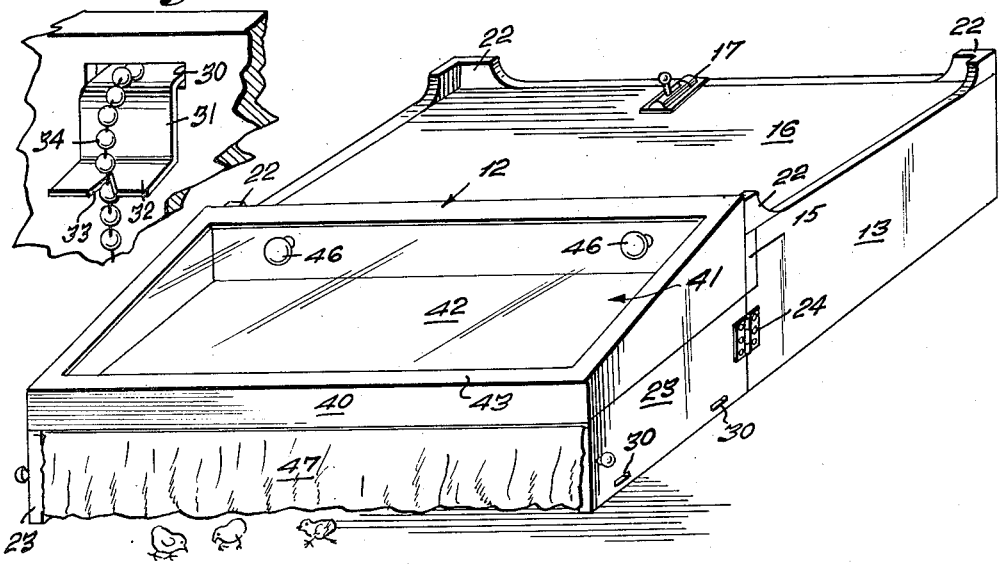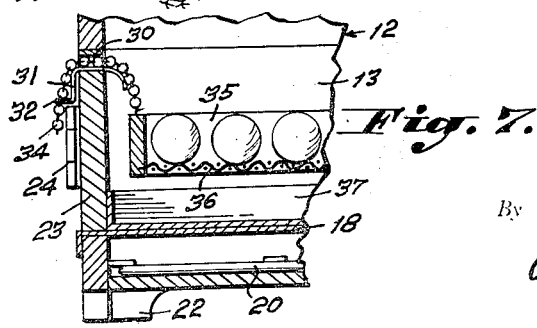

Patented Oct. 7, 1952

2,612,863

UNITED STATES PATENT OFFICE 2,612,863

HOUSING STRUCTURE FOR USE EITHER AS AN INCUBATOR OR BROODER

George H. Wade, Sr., Middlebush, N. J.

Application August 30, 1950, Serial No. 182,253

4 Claims. (Cl. 119—30)

This invention relates to a novel housing structure formed of sections capable of being arranged in different positions relatively to one another to provide either a brooder or incubator housing.

More particularly, it is an aim of the present invention to provide a structure of extremely simple construction wherein sections thereof may be arranged in one manner to provide an incubator housing and thereafter by a simple rearrangement of the sections relatively to one another, the parts equally well adapt themselves for use as a brooder housing.

Various other objects and advantages of the invention will hereinafter become more fully apparent from the following description of the drawings, illustrating a presently preferred embodiment thereof, and wherein:

Figure 1 is a perspective view, partly broken away, showing the housing assembled for use as an incubator;

Figure 2 is an end elevational view thereof;

Figure 3 is a cross sectional view taken on line 3—3 of Figure 1;

Figure 4 is an enlarged fragmentary perspective view showing the housing assembled as an incubator and with the upper portion thereof open and partly broken away;

Figure 5 is a perspective view showing the housing rearranged to provide a brooder;

Figure 6 is an enlarged longitudinal sectional view of a portion of the egg compartment when the unit is assembled as an incubator taken on line 6—6 of Figure 3;

Figure 7 is an enlarged fragmentary transverse sectional view similar to Figure 3, and Figure 8 is an enlarged fragmentary perspective view of an exterior portion of one section of the housing structure.

Referring more specifically to the drawings, the housing structure in its entirety is designated generally 10 and includes a bottom section, designated generally 11, and a top section, designated generally 12.

The bottom section 11 includes upright parallel end walls 13, a rear wall 14, which is secured to corresponding ends of the end walls 13, a bar 15 constituting a front wall part which is secured at its ends to the opposite ends of the end walls 13 and which terminates substantially below the upper edges of the end walls 13 and rear wall 14, and a removable bottom 16 which is suitably supported as by latch members 17 between the bottom portions of the walls 13 and 14 and the bar 15. A shield or partition 18 is suitably secured in the housing section 11 directly above the upper edge of the bar 15 and is disposed parallel to the bottom 16 and spaced therefrom. The bottom 16 and shield 18 combine to form a chamber 19 adapted to contain an electric heating element or unit 20 which is held in place therein by the bottom 16 and by lugs 21 which extend inwardly from the walls 13 and bar 15. Access is afforded to the heating element 20 by removal of the bottom 16. The section 11 is preferably but not necessarily provided with depending supporting legs 22 at the corners thereof.

Above the bar 15, the front of the section 11 is closed by a pair of corresponding doors 23 which are hinged at their remote ends to the end walls 13 by hinges 24 for swinging movement in planes parallel to the bottom 16. The rear wall 14 has a housing 25 mounted on its outer side and preferably intermediate of its ends which contains an electric motor 26 provided with an armature shaft 27 which extends through and is rotatably disposed in an opening of the rear wall 14. A fan 28 is secured to the armature shaft and disposed within the housing section 11, in the upper chamber thereof, located above the shield 18. Any suitable form of thermostat 29 may be mounted in the housing 25 and with a portion thereof extending through the rear wall 14 into the interior of the section 11 above the shield 18. The heating element 20, motor 26 and thermostat 29 are preferably connected in the same electric circuit, not shown, so that the motor will be operated to drive the fan 28 when the heating element 20 is energized as controlled by the thermostat 29 which is responsive to the temperature within the section 11.

The rear wall 14 and the doors 23 are provided adjacent their upper edges with openings 30 through which extend metal strips 31 which are suitably secured in the bottoms thereof and which strips 31 are provided with externally disposed outturned ends 32 each having an outwardly opening substantially V-shaped notch 33, as best seen in Figure 8. Each opening 30 is adapted to loosely receive a chain 34 of a conventional type formed of a plurality of balls connected in spaced apart relationship. A plurality, preferably four (4) chains 34 are connected to each of two egg trays 35 which are shown as being provided with a mesh wire fabric bottom 36. Each chain 34 is connected at one end to an egg tray 35 and extends upwardly therefrom and thence outwardly through one of the openings 30 over the strip 31 thereof and a portion of the chain between two of the balls or spheres thereof is positioned in the notch 33 of said strip 31 to adjustably anchor the chain thereto, as clearly illustrated in Figure 8, for supporting the egg tray 35 at any desired level above the shield 18. A tray 37, adapted to contain moist sand, not shown, is supported on the shield 18 beneath the egg trays 35. As the description proceeds it will become apparent that the trays 35 and 37 are not considered as a part of the invention but are merely illustrated and briefly described for the purpose of disclosing the use of the section 11 in combination with the section 12 as an incubator housing and the section 11, when thus used is disposed as seen in Figures 1 to 4 and with the doors 23 in closed positions as illustrated in these views. As thus disposed, the section 11 has an open top which is closed by the section 12, as best illustrated in Figure 4.

The section 12 includes a rectangular frame of the same length and width as the section 11 which is composed of corresponding end walls 38, a rear wall 39 and a front wall 40. The open top of the frame as defined by said walls slopes from the rear wall to the front wall, as best illustrated in Figures 2 and 3. The section 12 also includes a cover, designated generally 41 for closing the open top of the frame formed by the walls 38, 39 and 40 and which cover comprises a pane of glass 42, which is preferably glazed and which is enclosed in a frome 43. The frame 43 is connected by hinges 44 along one side thereof to the upper edge of the rear wall 39 so that the cover 41 may be swung upwardly to an open position, as illustrated in dotted lines in Figure 2. Thus, the cover 41 closes the top of the section 12 when in a normal closed position and the open bottom of the section 12 registers with the open top of the bottom section 11 when said top section 12 is superimposed thereon as seen in Figure 4 so that the sections 11 and 12 combine to form an incubator chamber 45. The rear wall 39 is preferably provided with lamp bulbs 46 which project inwardly thereof and which may be connected to any suitable source of electric current, not shown, for illuminating artificially the interior 45 of the sections 11 and 12 when assembled as an incubator.

To utilize the housing structure 11, 12 as a brooder, the top section 12 is first removed from the section 11 after which the egg trays 35 and sand tray 37 are removed. The section 11 is then inverted and the doors 23 are swung to open positions parallel to one another and in alignment with the end walls 13, as illustrated in Figure 5. The upper housing section 12 is then positioned on the doors 23 with the end walls 38 resting upon the edges of the doors 23 which are then disposed in uppermost positions and the rear wall 39 disposed in abutting engagement with the bar 15. The sections 11 and 12 are preferably each of a length which is twice the width of said sections so that each of the doors 23 is of a length equal to the width of the section 12 so that the front wall 40 will be disposed in alignment with the outer edges of the doors 23. A curtain 47 may be suspended between the outer ends of the doors 23 or from the lower edge of the front wall 40 to substantially close the opening between the outer edges of the doors 23 and below the front wall 40 to thus complete the brooder structure.

The motor 26, fan 28, heating element 20 and thermostat 29 may be utilized with the housing structure when arranged either as an incubator or brooder for heating the interior thereof and for circulating the air therein and the bulbs 46 may likewise be utilized under either arrangement for artificially lighting the interior of the housing. Likewise, with either arrangement access is afforded to the interior of the structure by swinging the cover 41 upwardly on its hinges 44 to an open position.

Current may be supplied to the electrical parts through an electrical conductor 48, as seen in Figures 1 and 4, which extends through an opening in the bar 15 into the chamber 19 and which is adapted to be connected to a conventional outlet socket by its plug 49.

Various modifications and changes are contemplated and may obviously be resorted to, without departing from the spirit or scope of the invention as hereinafter defined by the appended claims.

I claim as my invention:

1. A housing structure for use either as an incubator housing or as a brooder housing, comprising a base section having a closed bottom and an open top and including end walls, a rear wall and a front wall, said front wall having an upper edge disposed below the level of the upper edges of the end walls and rear wall, doors hinged to the end walls for swinging movement between aligned closed positions coplanar with the front wall and at right angles to said end walls and open positions parallel to one another and in alignment with the end walls, said doors extending from the open top of said base section to adjacent the upper edge of the front wall, a top section comprising a frame having an open bottom resting on the open top of the base section, a cover hinged to the upper edge of said frame along one side thereof for vertical swinging movement between a closed position against the open top of the frame and an open position out of engagement with the open top of the frame, said top section combining with the base section when disposed in superposed relationship thereon to form an incubator housing or being supported on the doors when the base section is inverted and the doors are in open positions to provide a brooder housing.

2. A housing structure as in claim 1, said cover including a pane constituting a window for admitting light to the housing structure when the cover is in a closed position.

3. A housing structure as in claim 1, said frame of the top section including a rear wall and a front wall each having an upper edge, the upper edge of the frame sloping downwardly from the rear wall to the front wall to support the cover at an incline when in a closed position, and the height of the top section being substantially less than the height of the base section whereby the cover when in a closed position is disposed at approximately the same level as the bottom of the base section when the housing structure is arranged to provide a brooder housing.

4. A housing structure as in claim 1, said base section and top section each being of a length equal to twice the width thereof, and said doors each being of a length corresponding to the width of either the top section or the base section.

GEORGE H. WADE, Sr.

REFERENCES CITED

The following references are of record in the file of this patent:

UNITED STATES PATENTS

| Number | Name | Date |
| --- | --- | --- |
| 849,235 | Harnett | Apr. 2, 1905 |
| 1,038,431 | Philo | Sept. 10, 1912 |
| 2,062,972 | Gertz, Sr. | Dec. 1, 1936 |
| 2,497,381 | Wade, Sr. | Feb. 14, 1950 |